United States Patent
Quintana

[19]

[11] Patent Number: 6,058,519
[45] Date of Patent: May 9, 2000

[54] TOILET OVERFLOW CONTROL

[75] Inventor: Richard Quintana, Westminster, Calif.

[73] Assignee: Niccole Family Trust, Huntington Beach, Calif.

[21] Appl. No.: 09/294,757

[22] Filed: Apr. 19, 1999

[51] Int. Cl.[7] .............................. E03D 11/02; E03D 11/18
[52] U.S. Cl. .......................... 4/427; 340/620; 73/304 C; 137/392; 137/558
[58] Field of Search ................................ 4/427, 421, 366, 4/367, 406, 415, 508; 340/620, 618, 604, 605; 73/304 R, 304 C; 116/109, 227; 137/558, 392

[56] References Cited

U.S. PATENT DOCUMENTS

| | | |
|---|---|---|
| 1,090,200 | 3/1914 | Cole . |
| 3,908,204 | 9/1975 | Hopkins . |
| 3,928,874 | 12/1975 | Albertson . |
| 3,987,502 | 10/1976 | Hartmann . |
| 4,041,557 | 8/1977 | Ringler . |
| 4,195,374 | 4/1980 | Morris et al. . |
| 4,203,173 | 5/1980 | Morris et al. . |
| 4,258,444 | 3/1981 | Orszullok . |
| 4,547,768 | 10/1985 | Kulhavy ................................... 340/620 |
| 4,563,780 | 1/1986 | Pollack ..................................... 137/392 |
| 4,985,944 | 1/1991 | Shaw . |
| 5,731,758 | 3/1998 | Suttlemyre et al. . |
| 5,732,417 | 3/1998 | Pondelick et al. . |
| 5,940,899 | 8/1999 | Mankin et al. ............................... 4/427 |

*Primary Examiner*—Henry J. Recla
*Assistant Examiner*—Tuan Nguyen
*Attorney, Agent, or Firm*—James G. O'Neill

[57] ABSTRACT

A flow control device for a toilet to prevent flooding upon obstructing of a waste outlet of a toilet bowl. The device includes a sensor assembly mounted on a clip held over a rim of the toilet bowl so as to hold the sensor assembly in a predetermined position within the toilet bowl. The clip may include adjustable elements thereon to enable the height of the sensor assembly to be adjusted, depending on the size and type of toilet in which it is affixed. If water bridges contacts on the sensor assembly, an electrical circuit is completed, and a solenoid is actuated to close a normally opened valve to shut off running water to the water tank of the toilet. The present invention is an easily-added-on, simplified device for use with a toilet bowl to prevent flooding, if the waste outlet of the toilet bowl is blocked for any reason.

20 Claims, 3 Drawing Sheets

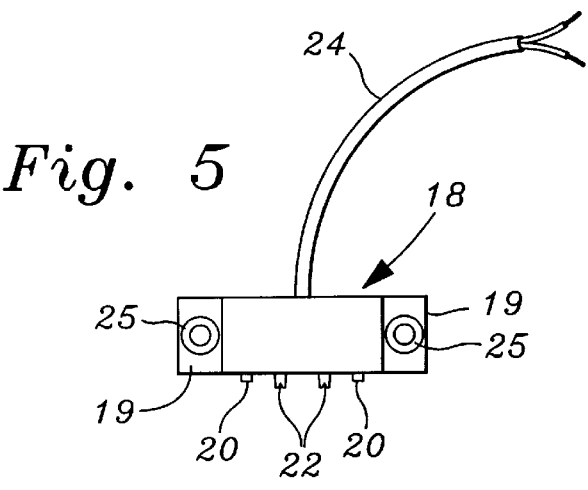
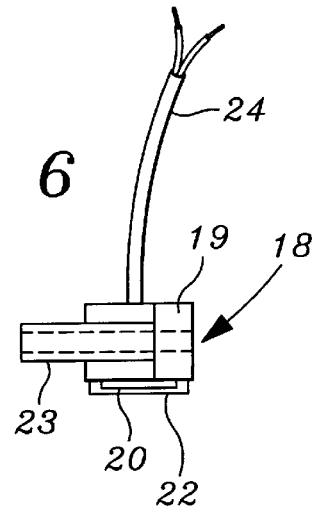
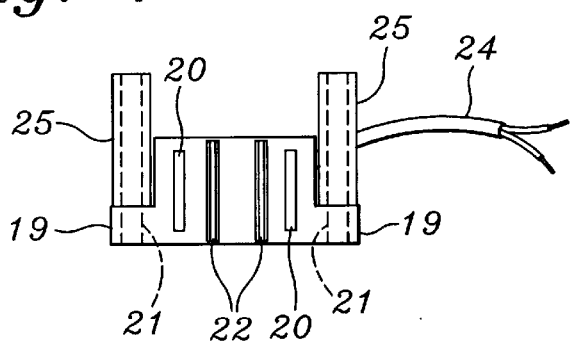

TOILET OVERFLOW CONTROL

BACKGROUND OF THE INVENTION

1. Field of the Invention

This invention relates generally to fluid control devices, and more particularly, to a device adapted to be mounted on a conventional toilet for controlling overflow of water, if the waste outlet thereof is obstructed.

2. Description of Related Art

As homeowners and those who work in and around certain types of institutions, such as retirement homes, convalescent homes, and the like, are aware, toilet bowls may become blocked for any number of reasons, and a person who repeatedly flushes such a toilet will cause it to flood. This flooding may cause serious problems, particularly in institutions, such as homes for the aged, since older people may slip and fall, or be subjected to diseases by such flooding waters.

Many patents have disclosed mechanical and electrically controlled water overflow devices to prevent the overflowing of toilets. Examples of such patents include U.S. Pat. Nos. 1,090,200 to Cole, 3,928,874 to Albertson, 3,987,502 to Hartmann, 4,041,557 to Ringler, 4,195,374 to Morris et al., 4,203,173 to Morris et al., 4,258,444 to Orszullok, 5,731,758 to Suttlemyre et al., 5,732,417 to Pondelick et. al., 3,908,204 to Hopkins and 4,985,944 to Shaw. These patents show that a system that detects the rise of water in a toilet bowl to a preset high-level, and then signals a valve unit to cause it to close and prevent further water delivery to the toilet system is old and well-known in the art. However, these patents tend to be complicated and expensive, and fail to disclose or teach a clip-on device that fits over a rim of a toilet bowl to locate a water detector in the bowl at a selected level to operate a solenoid valve. Furthermore, these patents fail to teach a system incorporating an adjustable clip that easily and conveniently positions the water detector, together with a warning-sounding alarm speaker or LED, and a low-voltage, rechargeable battery for energizing the system, as specifically disclosed in the operating system of the present invention.

Furthermore, the prior art devices tend to be complicated and expensive, and have to be built into a toilet being manufactured at a factory, or when installed in an institution, or the like. The present invention provides a simple and easy-to-use device which is easily attached to a toilet to prevent overflow in a more expeditious and cheaper manner.

SUMMARY OF THE INVENTION

Accordingly, it is a general object of the present invention to provide an improved and simplified overflow control device. It is a particular object of the present invention to provide an improved and simplified overflow control device, which easily clips onto and is held to a toilet bowl. It is yet another particular object of the present invention to provide an improved and simplified system, having a detecting portion which clips onto a toilet bowl and an operating portion, which is connected to a solenoid-operated valve means connected in the water line to the toilet. It is yet another particular object of the present invention to provide an improved and simplified overflow control device having a sensing member, which is adjustably attached to a clamping means held on a toilet bowl, so as to be useful with different size toilets, and which is electrically connected to a normally open solenoid valve means for controlling the flow of water to the toilet. And, it is still another particular object of the present invention to provide an improved and simplified flow control device having a battery-operated solenoid valve means, which connects to a detector switch held in a toilet bowl, and which includes a warning sounding alarm speaker and/or an LED device and a low-voltage, rechargeable battery pack for energizing the system.

These and other objects and advantages of the present invention are achieved by providing a detecting device mounted to a clip, which is removably secured to a rim of a toilet bowl, electrically connected to a solenoid-operated valve for controlling the water flow to the toilet. The device of the present invention may also have a warning-sounding alarm speaker and/or flashing LED connected to the solenoid, as well as a low-voltage, rechargeable battery pack for energizing the solenoid.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 5 is a top plan view of the detecting or sensor device used with the system of the present invention;

FIG. 6 is a side elevational view of the detecting device of FIG. 5; and FIG. 7 is a bottom plan view of the detecting device of FIG. 5.

DESCRIPTION OF THE PREFERRED EMBODIMENTS

Figure 1:
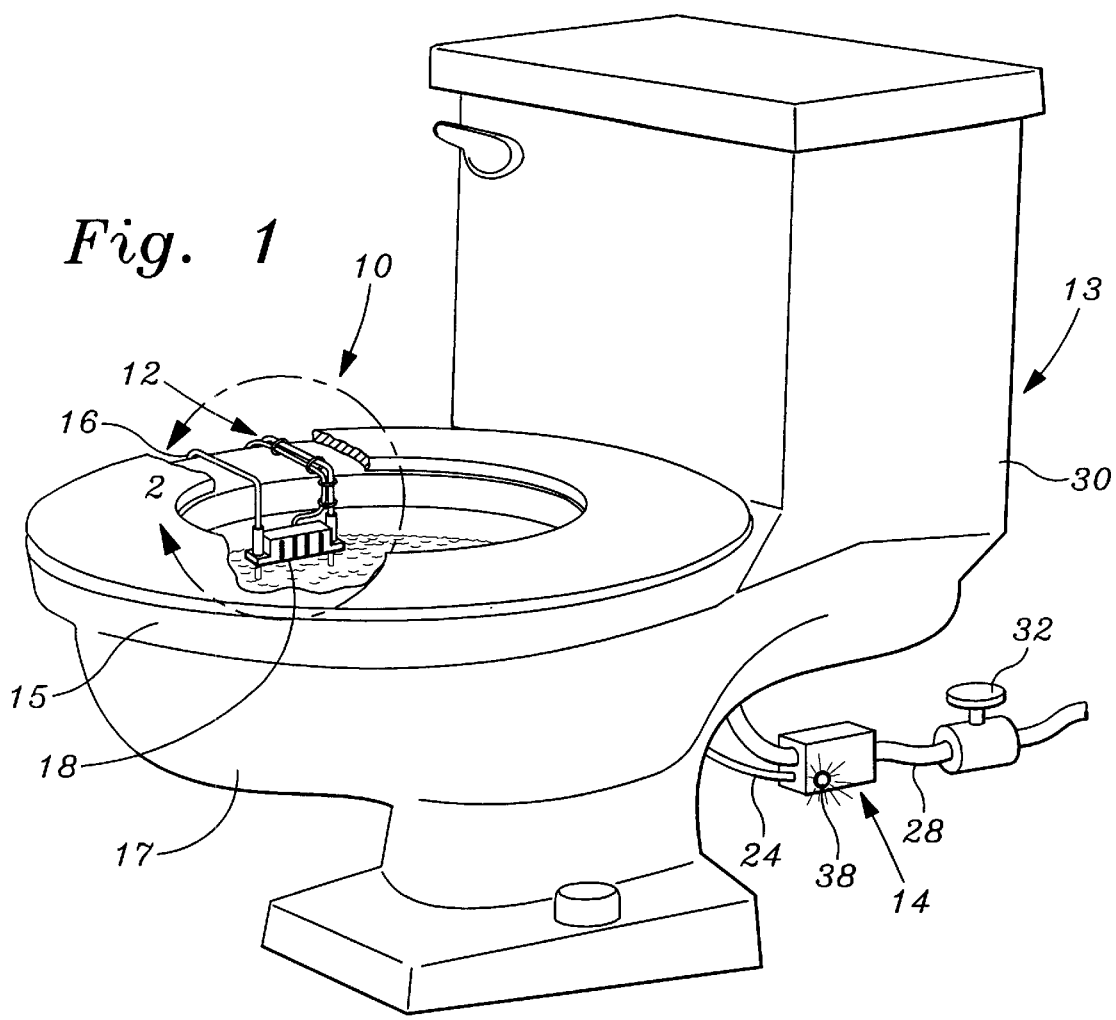
FIG. 1 is a perspective view of a conventional toilet having a seat partially broken away showing a clip-on detecting device mounted thereon and electrically connected to a solenoid operated valve means in a water feed line.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified overflow detecting system 10 comprised of a water detector or sensor 12 and a solenoid-actuated valve system 14. The water level detector or sensor 12 is mounted on the rim 15 of a bowl 17 of a conventional or low-water-use toilet 13 as by means of a flexible clip-on assembly 16 supporting a detector or sensor element 18, having a normally open-switch element therein, of a type well known to those skilled in the art. The detector or sensor element 18 has a pair of metallic contacts 20 on either side of spacing walls or elements 22. The detector element 18, as stated, includes a normally open switch, which will be closed when the water level in the toilet bowl 17 reaches a predetermined level and contacts the two wire elements 20. Upon contacting wire elements 20, a circuit is completed through a wire 24 to actuate a solenoid 26, to close the normally open valve, in a known manner, so as to shut-off water flow from a water supply pipe 28 to the water tank 30 at the back of the toilet 13. The water supply pipe 28 has a cut-off valve 32, of a type well known to those skilled in the art, before the solenoid valve portion 14, so that water pressure can be manually shut-off, as needed.

Figure 2:
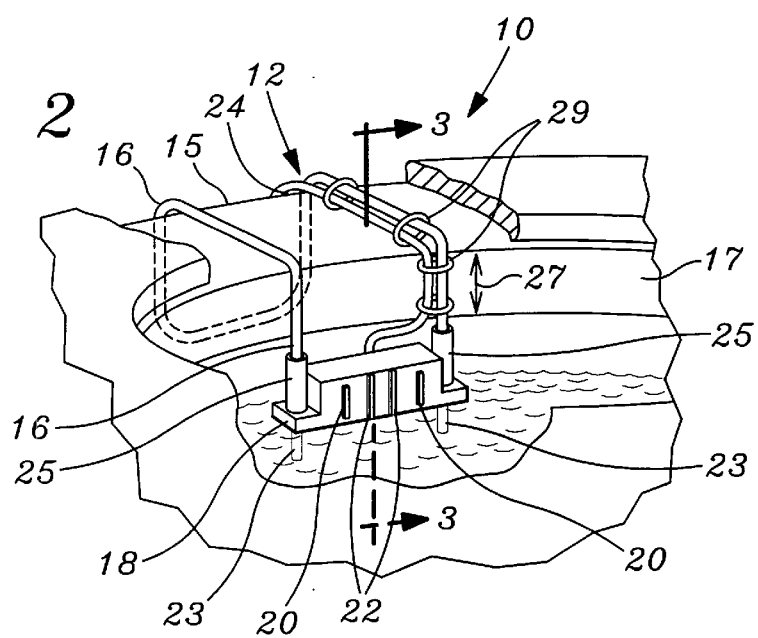
FIG. 2 is an enlarged view taken along line 2—2 of FIG. 1.
Figure 3:
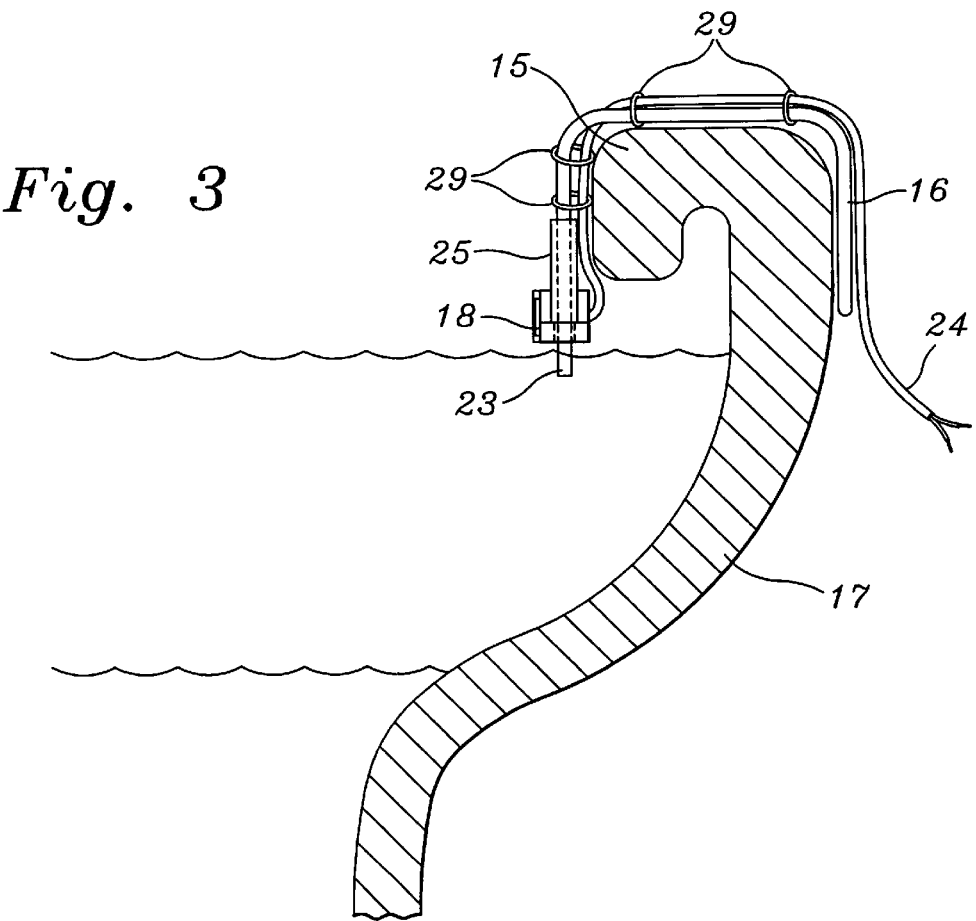
FIG. 3 is an enlarged, partial sectional view showing how the device is supported on the rim of the toilet bowl, and projects downwardly to detect the height of the water therein.

As best shown in FIGS. 1–3, the sensor element 18 is preferably mounted on the clip 16 in an adjustable manner, and the clip-on is preferably made from a flexible plastic or metal. For example, the sensor element 18 preferably includes arm portions 19 at both ends having openings 21 therein. Separate open ends 23 of the clip-on holder 16 are then inserted and held in elongated, tubular elements 25, secured to the arms 19, aligned with the openings 21. Ratcheting elements or securing means, such as aligned holes and pins, are contained in the elongated, tubular elements 25, and the ends 23 of the clip-on 16, to enable the detector or sensor element 18 to be adjusted or slid on the clip-on 16, to different heights in the toilet bowl. This adjustability allows the clip-on 16 to be held on the rim 15 of various toilets, and the detector or sensor element 18 to be adjusted upwardly or downwardly, in the direction of the arrow 27 (see FIG. 2) to a desired position within the toilet bowl 17. The wire 24 is preferably held in one or more rings 29 on either of the arms of the clip-on 16, to guide the wire 24 when adjusting the detector or sensor element 18.

Figure 4:
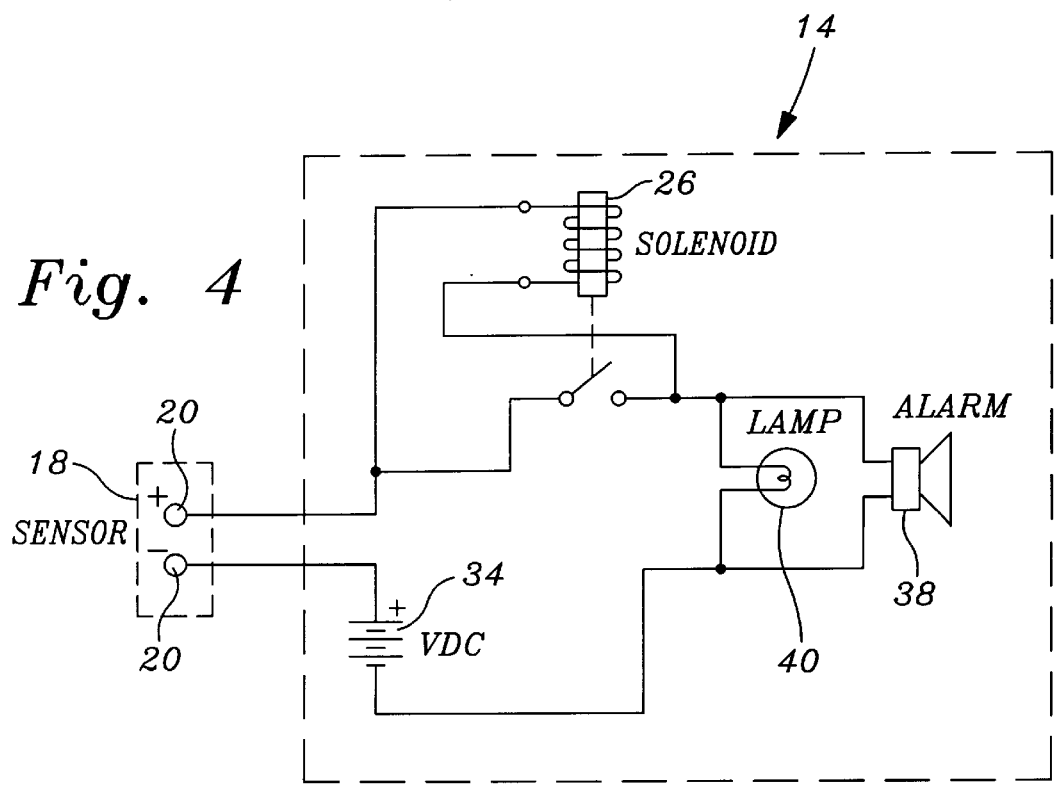
FIG. 4 is a schematic view of a preferred embodiment of the circuitry for the detecting device and solenoid operator of the present invention.

As best shown in FIG. 4, the solenoid 26 is preferably powered by a 12 volt dc battery 34, which is rechargeable, in a system (not shown), in a known manner. A warning sound alarm speaker, or the like, 38 sounds an alarm to indicate that the solenoid valve has been closed, because too much water is in the toilet bowl. The speaker 38 may be replaced or augmented by an LED light or indicator 40 that will flash or provide a continuous light to indicate that the solenoid has been actuated, the valve is closed and that water flow to the toilet is shut off.

If the water in the bowl 17 falls below the level of the sensor element 18, the circuit will be opened, the solenoid 28 will be deactivated, opening the valve, and water will again flow to the toilet tank 30 via line 28, so that the toilet may be used again in a normal manner.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An overflow control device for a toilet, comprising, in combination:
    a flexible, clip-on assembly adapted to be secured to a rim of a toilet bowl;
    a detector element secured at one end of the flexible, clip-on assembly for insertion into a toilet bowl; and
    a wire connected between the detector element and a solenoid-actuated, normally opened valve, adapted to be connected to a waterline connected to a water tank toilet to which the overflow control device is attached.

2. The overflow control device of claim 1 wherein the detector element is adjustably held on the flexible clip-on assembly.

3. The overflow control device of claim 2, further including guiding elements for the wire, and wherein the clip-on assembly is plastic or metal.

4. The overflow control device of claim 3, further including a warning-sounding speaker in the solenoid-actuated valve.

5. The overflow device of claim 1 wherein the flexible clip-on assembly is made from plastic.

6. The overflow control device of claim 5, further including a valve-closed indicator on the solenoid-actuated, normally opened valve.

7. The overflow control device of claim 6 wherein the valve-closed indicator is a speaker, which issues a warning sound.

8. The overflow control device of claim 7, further including a light indicator connected to the speaker.

9. The overflow control device of claim 8 wherein the detector element is adjustably held on the flexible clip-on assembly.

10. The overflow control device of claim 9, further including guiding rings mounted on the flexible, clip-on assembly for holding the wire in position.

11. The overflow control device of claim 6 wherein the valve-closed indicator is a light.

12. The overflow control device of claim 11 wherein the detector element is adjustably held on the flexible clip-on assembly.

13. The overflow control device of claim 12, further including guiding rings mounted on the flexible, clip-on assembly for holding the wire in position.

14. A combination overflow control device and toilet, comprising, in combination:
    the toilet including a toilet bowl having a rim, a water tank and a water line connected to the water tank;
    a flexible, clip-on assembly having a sensor assembly held at one end, releasably secured to the rim, with the sensor assembly held in the toilet, above a top surface of any water held therein;
    a solenoid-operated, normally opened valve, including an electrical power source, connected in the waterline to control the flow of water to the water tank;
    a wire connected between the sensor assembly and the solenoid-operated, normally opened valve; and
    the sensor assembly including a pair of electrical contacts held on an outside wall thereof, whereby, if the water rises in the toilet bowl and bridges the two electrical contacts, a circuit will be completed to connect the electrical power source to the solenoid so as to close the normally opened valve, and stop the flow of water to the water tank.

15. The combination overflow control device and toilet of claim 14 wherein the sensor assembly is adjustably mounted on the flexible, clip-on assembly.

16. The combination overflow control device and toilet of claim 15, further including guiding rings mounted on the flexible, clip-on assembly for holding the wire in position.

17. The combination overflow control device and toilet of claim 16, further including a valve-closed indicator on the solenoid-operated, normally closed valve.

18. The combination overflow control device and toilet of claim 17 wherein the valve-closed indicator is a speaker which issues a warning sound.

19. The combination overflow control device and toilet of claim 17 wherein the valve-closed indicator is a light, and the flexible, clip-on assembly is plastic or metal.

20. An overflow control device for a toilet, comprising, in combination:

a flexible, clip-on assembly having a rim attachment end and a sensor holding end;

a sensor assembly adjustably held in the sensor holding end;

the rim attachment end adapted to be attached to the rim of a toilet bowl with the sensor assembly held within the toilet bowl and above a surface of any water held therein;

a solenoid-actuated, normally opened valve, having a power source and a closed indicator, adapted to be held in a waterline to a toilet to control the flow of water to a water tank in the toilet; and a wire connected between the sensor assembly and the solenoid-actuated valve.

* * * * *